United States Patent [19]
Voigt et al.

[11] Patent Number: 6,055,604
[45] Date of Patent: Apr. 25, 2000

[54] FORCED TRANSACTION LOG POSTING USING A LEAST BUSY STORAGE MEDIA WITHOUT MAINTAINING REDUNDANCY OF THE TRANSACTION LOG

[75] Inventors: Douglas L. Voigt, Boise; Don L. Burkes, Meridian; Kirk A. Hanson, Eagle, all of Id.

[73] Assignee: Hewlett-Packard Company, Palo Alto, Calif.

[21] Appl. No.: 08/920,120

[22] Filed: Aug. 26, 1997

[51] Int. Cl.[7] ..................................................... G06F 12/08
[52] U.S. Cl. ........................... 711/117; 711/113; 711/114; 711/143; 711/156; 711/162; 710/52; 710/57; 714/6; 714/16; 714/19; 714/20
[58] Field of Search ..................................... 711/112, 143, 711/162, 117, 4, 113, 114, 156, 161, 165; 710/52, 30, 34, 53, 57; 714/20, 6, 16, 19

[56] References Cited

U.S. PATENT DOCUMENTS

4,633,387  12/1986  Hartung et al. .......................... 711/112

*Primary Examiner*—Hiep T Nguyen
*Attorney, Agent, or Firm*—Lane R. Simmons

[57] ABSTRACT

A transaction log stored in a first memory is posted to one of two separate log areas, selectively, on a storage system having a plurality of storage media such as disk drives. Posting occurs to a "disk log" area when a page-full status of the first memory transaction log is detected. Alternatively, when a posting request occurs before a page-full status of the transaction log has been detected, then posting occurs immediately to a least busy disk of a "staging log" area. Posting occurs to the least busy disk of the "staging log" area by circumventing normal storage system data management and redundancy techniques such that data in the staging log area is not kept redundantly on the storage media. Rather redundancy is maintained by the fact that the transaction log remains with the first memory in addition to being copied to the staging log area. The staging log area includes reserved space on each of the plurality of storage media and is divided into logically separate portions on each of the storage media. This prohibits two consecutive "force" postings from overwriting the same portion of the reserved area, regardless of which disk is the least busy. Finally, sequence numbers and disk set numbers are associated with data records that are posted to the disk log areas for enabling recovery of the transaction log data from the disk log areas.

21 Claims, 7 Drawing Sheets

FORCED TRANSACTION LOG POSTING USING A LEAST BUSY STORAGE MEDIA WITHOUT MAINTAINING REDUNDANCY OF THE TRANSACTION LOG

FIELD OF THE INVENTION

This invention relates in general to data storage systems and, more particularly, to transaction log management for disk array storage systems.

BACKGROUND OF THE INVENTION

Computer systems are constantly improving in terms of speed, reliability, and processing capability. As a result, computers are able to handle more complex and sophisticated applications. As computers improve, performance demands placed on mass storage and input/output (I/O) devices increase. Thus, there is a continuing need to design mass storage systems that keep pace in terms of performance with evolving computer systems.

This invention particularly concerns the mass storage systems of the disk array type. Disk array data storage systems have multiple storage disk drive devices which are arranged and coordinated to form a single mass storage system. There are three primary design criteria for mass storage systems: cost, performance, and availability. It is most desirable to produce memory devices that have a low cost per megabyte, a high input/output performance, and high data availability. "Availability" is the ability to access data stored in the storage system and the ability to insure continued operation in the event of some failure. Typically, data availability is provided through the use of redundancy wherein data, or relationships among data, are stored in multiple locations. Two common methods of storing redundant data are the "mirror" and "parity" methods.

One problem encountered in the design of disk array data storage systems concerns the issue of retaining accurate mapping information of the data in store in the event of a system error or failure. This is true for systems that employ either one or both methods of storing redundant data. Thus, in the course of managing disk array mapping information, it is often necessary to insure that recently changed mapping information is stored on disk for error recovery purposes. This disk write requirement may occur for several reasons, such as (i) a time based frequency status update, (ii) a log page full status, or (iii) a specific host request. Generally, recent changes are accumulated at random locations in data structures that are optimized for performance of the disk array function and, in addition, are accumulated sequentially in a log which can be written to disk (posted) more quickly than the other data structures. This technique is common in the art of transaction processing. Disadvantageously, however, the posting requirement may occur concurrently with other ongoing disk read or write activity thereby creating I/O contention in the system. Such I/O contention often extracts a significant performance hit on the system, especially if the posting occurs frequently, because multiple I/O events must occur for a single posting of the log to disk. For example, typically, the log page is first marked as invalid (i.e., it feeds to be updated). Then, the log page is copied to disk and subsequently marked valid. Finally, in a redundant system, the redundant log page is copied to disk.

In view of the forgoing, and of the ever increasing computing speeds offered and massive amounts of information being managed, there is a constant need for improved performance in disk array systems and the like. Accordingly, an object of the present invention is to provide improved subsystem disk log performance.

SUMMARY OF THE INVENTION

According to principles of the present invention in a preferred embodiment, a transaction log stored in a first memory is posted to one of two separate log areas, selectively, on a storage system having a plurality of storage media such as disk drives. Specifically, posting occurs to a "disk log" area when a page-full status of the first memory transaction log is detected. Alternatively, when a posting request occurs before a page-full status of the transaction log has been detected, then, advantageously, posting occurs immediately to a least busy disk of a "staging log" area.

According to further principles, posting to the "disk log" occurs using normal storage system management and data redundancy techniques. On the other hand, posting occurs to the "staging log" area by circumventing normal storage system data management and redundancy techniques such that data in the staging log area is not kept redundantly on the storage media. Rather, redundancy is maintained by the fact that the transaction log remains with the first memory in addition to being copied to the staging log area.

The staging log area includes reserved space on each of the plurality of storage media, and the reserved space is divided into logically separate portions on each of the storage media. This configuration enables postings to the staging log to be "toggled" between the reserved portions. As such, two consecutive staging log postings never overwrite the same portion of the reserved area, regardless of which disk is the least busy.

According to yet further principles, sequence numbers and disk set numbers are assigned to data records that are posted to the log areas on the storage media. Recovery of data from the disk log and staging log areas includes referencing the sequence numbers and disk set numbers to properly reconstruct the complete transaction log.

Other objects, advantages, and capabilities of the present invention will become more apparent as the description proceeds.

DETAILED DESCRIPTION OF THE INVENTION

Figure 1:
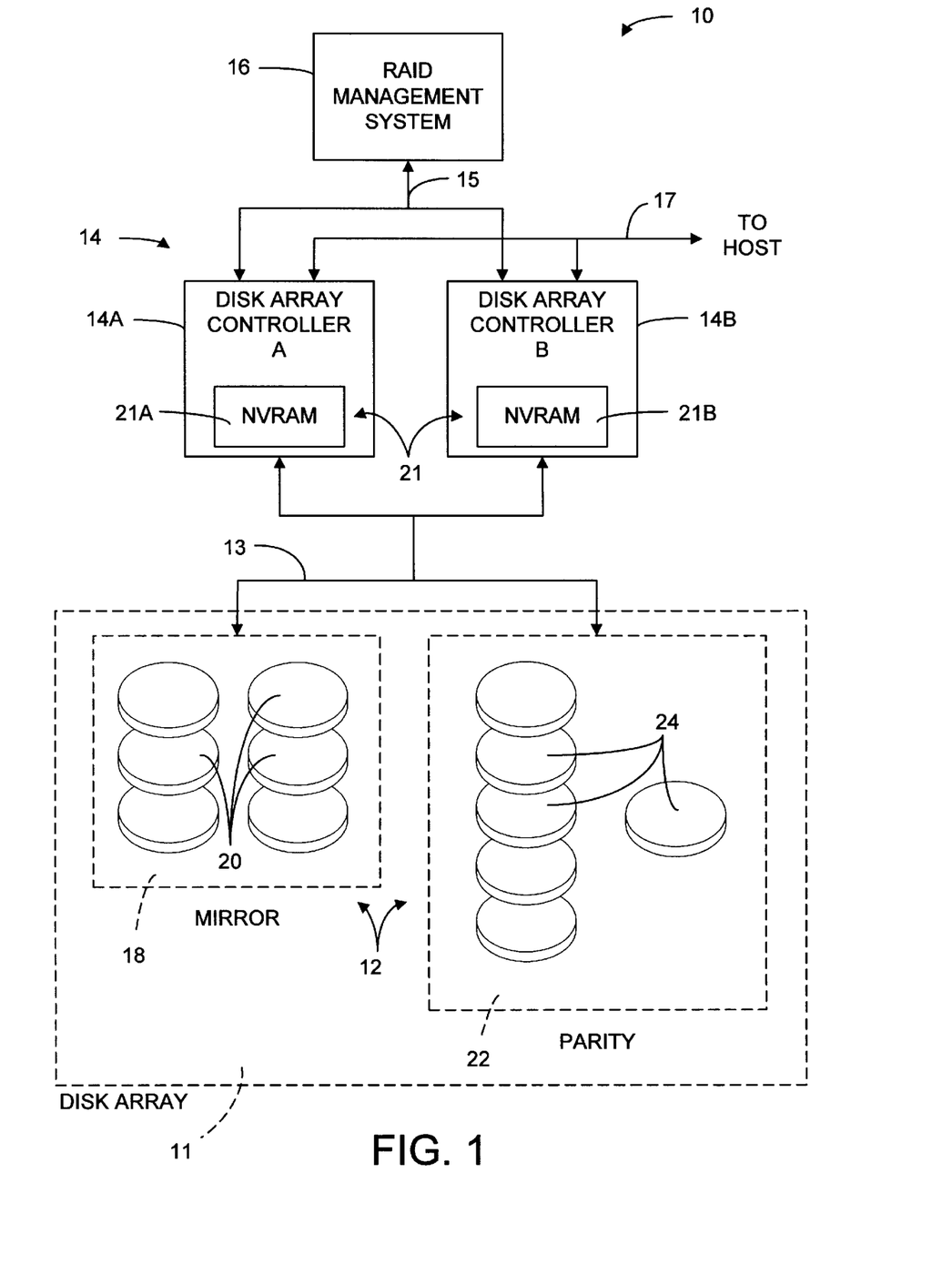
FIG. 1 is a block diagram of a disk array data storage system employing the present invention distributed write disk log method.

FIG. 1 shows a data storage system 10 employing the present invention distributed write disk log system and method. In the example shown, data storage system 10 is a disk array data storage system which includes a hierarchic disk array 11. A non-hierarchic array (not shown) is equally applicable with the present invention. Disk array 11 includes a plurality of storage disks 12 for implementing a RAID (Redundant Array of Independent Disks) storage system. Data storage system 10 includes disk array controller 14 coupled to the disk array 11 to coordinate data transfer to and from the storage disks 12, and further includes RAID management system 16. RAID management system 16 includes means for effectuating the distributed write disk log method of the present invention.

For purposes of this disclosure, a "disk" is any non-volatile, randomly accessible, rewritable mass storage device which has the ability of detecting its own storage failures. It includes both rotating magnetic and optical disks and solid-state disks, or non-volatile electronic storage elements (such as PROMs, EPROMs, and EEPROMs). The term "disk array" is a collection of disks, the hardware required to connect them to one or more host computers, and management software used to control the operation of the physical disks and present them as one or more virtual disks to the host operating environment. A "virtual disk" is an abstract entity realized in the disk array by the management software.

The term "RAID" means a disk array in which part of the physical storage capacity is used to store redundant information about user data stored on the remainder of the storage capacity. The redundant information enables regeneration of user data in the event that one of the array's member disks or the access path to it fails. A more detailed discussion of RAID systems is found in a book entitled, *The RAIDBook: A Source Book for RAID Technology*, published Jun. 9, 1993, by the RAID Advisory Board, Lino Lakes, Minn. Although a RAID system is exemplified in connection with the present invention, it is obvious that a non-RAID system is also equally applicable.

Disk array controller 14 is coupled to disk array 11 via one or more interface buses 13, such as a small computer system interface (SCSI). RAID management system 16 is operatively coupled to disk array controller 14 via an interface protocol 15. It should be noted that RAID management system 16 can be embodied as a separate component as shown (i.e., as software or firmware), or configured within disk array controller 14 or within the host computer to provide a data manager means for controlling disk storage and reliability levels, for transferring data among various reliability storage levels, and for implementing distributed write disk logging of the present invention. Data storage system 10 is also coupled to a host computer (not shown) via an I/O interface bus 17.

In the system shown, disk array controller 14 is implemented as a dual controller consisting of disk array controller "A" 14a and disk array controller "B" 14b. Dual controllers 14a and 14b enhance reliability by providing continuous backup and redundancy in the event that one controller becomes inoperable. However, the methods of this invention can be practiced with a single controller or other architectures. In fact, the present invention may be considered especially valuable in a single controller architecture where the need for maintaining a complete and accurate disk log is even more critical than in the dual controller environment.

The hierarchic disk array 11 can be characterizable as different storage spaces, including its physical storage space and one or more virtual storage spaces. For example, storage disks 12 in disk array 11 can be conceptualized as being arranged in a mirror group 18 of multiple disks 20 and a parity group 22 of multiple disks 24. These various views of storage are related through mapping techniques. For example, the physical storage space of the disk array can be mapped into a virtual storage space which delineates storage areas according to the various data reliability levels. Some areas within the virtual storage space can be allocated for a first reliability storage level, such as mirror or RAID level 1, and other areas can be allocated for a second reliability storage level, such as parity or RAID level 5. These areas may be configured on the same or separate disks or any combination thereof.

Data storage system 10 includes a memory map store 21 that provides for persistent storage of the virtual mapping information used to map disk array 11. The memory map store is external to the disk array, and preferably resident in the disk array controller 14. The memory mapping information can be continually or periodically updated by the controller 14 or RAID management system 16 as the various mapping configurations among the different views change.

Preferably, the memory map store 21 is embodied as two non-volatile RAMs (Random Access Memory) 21a and 21b which are located in respective controllers 14a and 14b. The dual NVRAMs 21a and 21b provide for redundant storage of the memory mapping information. The virtual mapping information is duplicated and stored in both NVRAMs 21a and 21b according to mirror redundancy techniques. In this manner, NVRAM 21a can be dedicated to storing the original mapping information and NVRAM 21b can be dedicated to storing the redundant mapping information.

As indicated, disk array 11 has multiple storage disk drive devices 12. The management of redundancy on devices 12 is coordinated by RAID management system 16. When viewed by the user or host application program, an application-level virtual view can represent a single large storage capacity indicative of the available storage space on storage disks 12. RAID management system 16 can dynamically alter the configuration of the RAID areas over the physical storage space. As a result, the mapping of the RAID areas in a RAID-level virtual view onto the disks and the mapping of a front end virtual view to the RAID view are generally in a state of change. The memory map store in NVRAMs 21a and 21b maintains the current mapping information used by RAID management system 16 to map the RAID areas onto the disks, as well as the information employed to map between the two virtual views. As the RAID management system dynamically alters the RAID level mappings, it also updates the mapping information in the memory map store to reflect the alterations.

However, regardless of the RAID scheme or data storage scheme employed in a disk array, it is clear that the memory map 21 is generally in a constant state of change throughout system use. Thus, memory map log records are maintained and constantly posted from memory to disk by RAID management system 16 to ensure recovery of the same in the event of a loss of NVRAMs 21. Accordingly, the present invention provides improved system performance for disk log writing by managing and distributing certain of the log writes to any least busy disk selected from across the multiple available disks 12, thus reducing contention for disk accesses between log I/Os and other I/O's in progress. In general, this is accomplished by reserving a "staging log" area on each disk 12 for retention of the most recent portion of the log. Then, if a request to post occurs prior to a page of the transaction log memory being full, then the posting occurs substantially immediately to the reserved "staging log" area of which ever disk is the least bust. Subsequently, when log recovery is required, the fragments from all the disks 12 are collapsed into a single complete image.

Figure 2:
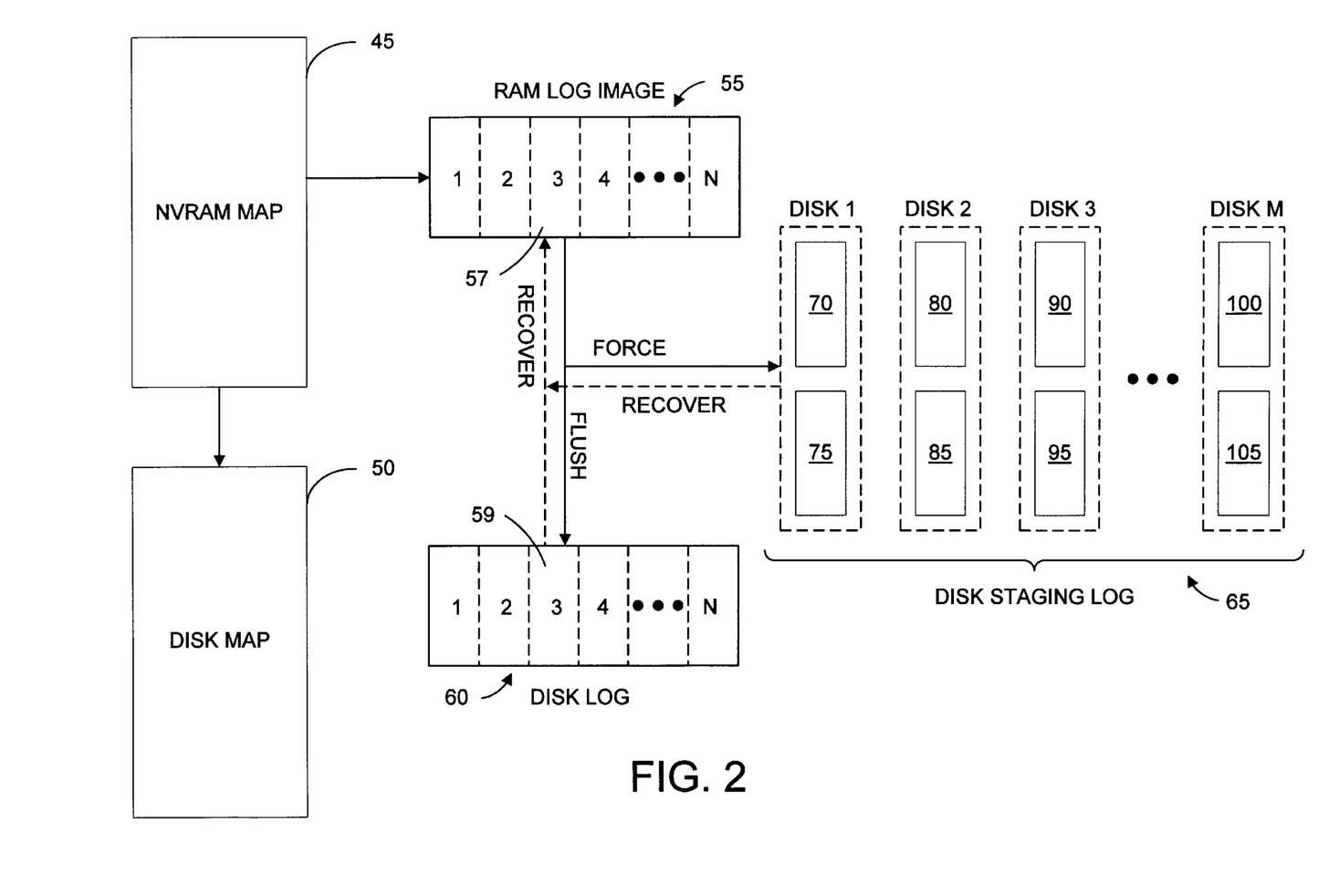
FIG. 2 is a block diagram showing transaction logging of the present invention using distributed log writes.

Referring now to FIG. 2, a block diagram depicts the distributed write disk logging aspects of the present invention. NVRAM map 45 represents a subset of non-volatile memory 21 on controller 14a/14b (FIG. 1) in which data is stored for use in connection with disk storage system 10. Disk map 50 resides on array 11 (redundantly) and is a conventional disk map image of NVRAM map 45. Regular storing (posting) of NVRAM map 45 to disk map 50 provides a means for retaining a redundant copy of the contents of NVRAM map 45 on disk for error recovery purposes. Generally, posting of NVRAM map 45 to disk map 50 occurs as a background process (as controlled by RAID management system 16) when normal system processing and I/O contentions allow. As such, posting of NVRAM map 45 data to disk map 50 is subject to normal system contentions for I/O access and disk space and, therefor, bears an element of uncertainty regarding when posting will actually occur. RAM log image (RLI) 55 is also a subset of memory 21, or it may be a separate memory (but preferably non-volatile). RLI 55 is used for quickly storing/recording incremental changes that occur in NVRAM map 45. In a preferred embodiment, RLI 55 includes sixteen (shown as N) addressable 64K byte pages although other configurations are also feasible. The incremental changes stored in RLI 55 are subsequently posted to disk log 60 or disk staging log 65 when requested to do so by RAID management system 16.

Several factors may cause RAID management 16 to initiate a posting request of data from RLI 55 to disk log 60 or disk staging log 65. For example, in a preferred embodiment, a "flush" posting request to disk log 60 is initiated by an RLI "page-full" status that is met. When a "flush" posting occurs, a full page of transaction log data from RLI 55 is written to disk log 60. On the other hand, a "force" posting request to disk staging log 65 is initiated by (i) a time based frequency requirement that is met, or (ii) a specific host request that is received. When a "force" posting occurs, one or more full blocks of transaction log data from RLI 55 are written to disk staging log 65. The one or more blocks include those blocks (within the current page) that were not previously completely written and that contain one or more transaction log records that have not been written. The page that is "flush" written to disk log 60, and the blocks that are "force" written to disk staging log 65, will be referred to herein as the "unwritten" data of RLI 55 (even though a "flush" written page may contain some records that were previously "force" written to staging log 65). In any case, such postings (either to disk log 60 or disk staging log 65) ensure that changes in NVRAM map 45 (as caught in RLI 55) are stored to disk array 11 for error recovery purposes in case of a loss to NVRAM 21 when disk map 50 has not been updated.

Disk log 60 resides on array 11 (FIG. 1) and is a conventional disk image of RLI 55. Preferably, disk log 60 is capable of storing multiple pages of data, similar to RLI 55. As shown, disk log 60 is labeled with N pages for storing data and, as conventional in the art, may be contiguous or circularly linked. Disk log 60 is stored and managed on disk array 11 using normal data redundancy schemes of disk storage system 10 (of FIG. 1). As such, a "flush" posting of the "unwritten" contents of RLI 55 to disk map 60 occurs under normal I/O circumstances and is subject to system I/O contentions for disk access and space. Although disk log 60 is generally updated more often than disk map 50, it only retains the incremental changes to NVRAM map 45 (as caught in RLI 55) whereas disk map 50 retains a complete image of NVRAM map 45 (as of the last update).

Disk staging log 65 includes reserved staging areas 70, 75, 80, 85, 90, 95, 100 and 105 (referred to as 70–105) which represent portions of the disks of disk array 11 (FIG. 1). As mentioned, in a preferred embodiment, disk staging log 65 is used to store the contents of RLI 55 upon specified events or times other than a "page-full" status. However, this criteria for posting is flexible with system design changes and/or user override considerations as would be obvious to those of ordinary skill in the art. In any case, when a specified event occurs (other than a "page-full" status) as requested by RAID management system 16, RLI 55 "force" posts its "unwritten" contents to any one of the disks 1–M of disk staging log 65, which ever disk is the least busy. A least busy disk is detected by monitoring I/O activity of disks 1–M of array 11.

In essence, a "force" of RLI 55 to the least busy disk effectuates a distributed write of the transaction log across the disk array over time. This is in contrast to a page-full "flush" of RLI 55 to a given, single disk log 60. Although disk log 60 may actually be spread out over multiple disks in the event a parity redundancy scheme is used, it is in essence a "single" or "non distributed" disk log because only one base address is needed/used on a single disk drive in order to address/access the entire log (not considering any redundant copy).

Advantageously, a "force" posting occurs with reduced I/O contention (relative to other ongoing system read/write I/O activity) because the least busy disk is selected. Thus, unlike posting to disk map 50 or disk log 60, this distributed write posting to disk staging log 65 is generally assured immediate (or at least quicker) completion. Additionally, a "force" posting is generally quicker than a "flush" posting because only a minimum number of unwritten blocks are transferred.

In contrast to disk log 60, disk staging log 65 retains the incremental changes noted in RLI 55 in a distributed, non-redundant fashion across disk array 11. It is non-redundant because the writes that occur to disk staging log 65 are excepted from the normal redundancy schemes of RAID management system 16. Thus, at least one less I/O step occurs in posting to disk staging log 65 relative to disk log 60. Redundancy is maintained after a "force" posting by the fact that the transaction log remains with the first memory in addition to being copied to the staging log area.

In a preferred embodiment, each disk 1–M in array 11 has a dedicated amount of space reserved for storing the distributed log. For example, two 64K byte pages 70/75, 80/85, 90/95 and 100/105 are reserved on each disk in the illustration shown. At least two pages are reserved on each disk to avoid potential overwriting of (and loss of) valid data in the event of some failure during the disk staging log posting process. Specifically, RLI 55 writes (posts/forces) to pages in disk staging log 65 in an alternating (swapping or toggling) even/odd manner. For example, upon a first write, RLI 55 may post to an even numbered reserved page 70, 80, 90 or 100 on whichever disk is least busy. Then, on a next write that occurs, RLI 55 posts to the odd numbered page 75, 85, 95 or 105 of whichever disk is the least busy. In this manner, the system is assured another level of data integrity and avoids a potential overwriting (i.e., in the event the same least busy disk is selected consecutively) of most recently posted data during a next consecutive posting that occurs.

Referring now to FIGS. 3–6, these block diagrams depict a portion of a page 57 of RLI 55 and a portion of each page 70–105 of disk staging log 65 to further detail exemplary distributed write disk staging activities under the present invention. Specifically, different snapshots in time of the status of disk staging log 65 is shown in each FIGS. 3–6 in response to separate postings from RLI 55. Page 57 of RLI 55 and each staging log page 70–105 are shown as being divided (logically) into three 512 byte blocks (or sectors) B1, B2 and B3 by the dashed lines. For clarity and ease of discussion purposes, only three blocks rather than all the blocks in each 64K byte page are shown. Log image page 57 (of RLI 55) is referenced herein and on the diagram as "LI". In addition, each disk in disk staging log 65 is referenced as "D1–DM" respectively, and each of the dual pages reserved in each disk is referenced as "P1" or "P2" respectively.

Figure 3:
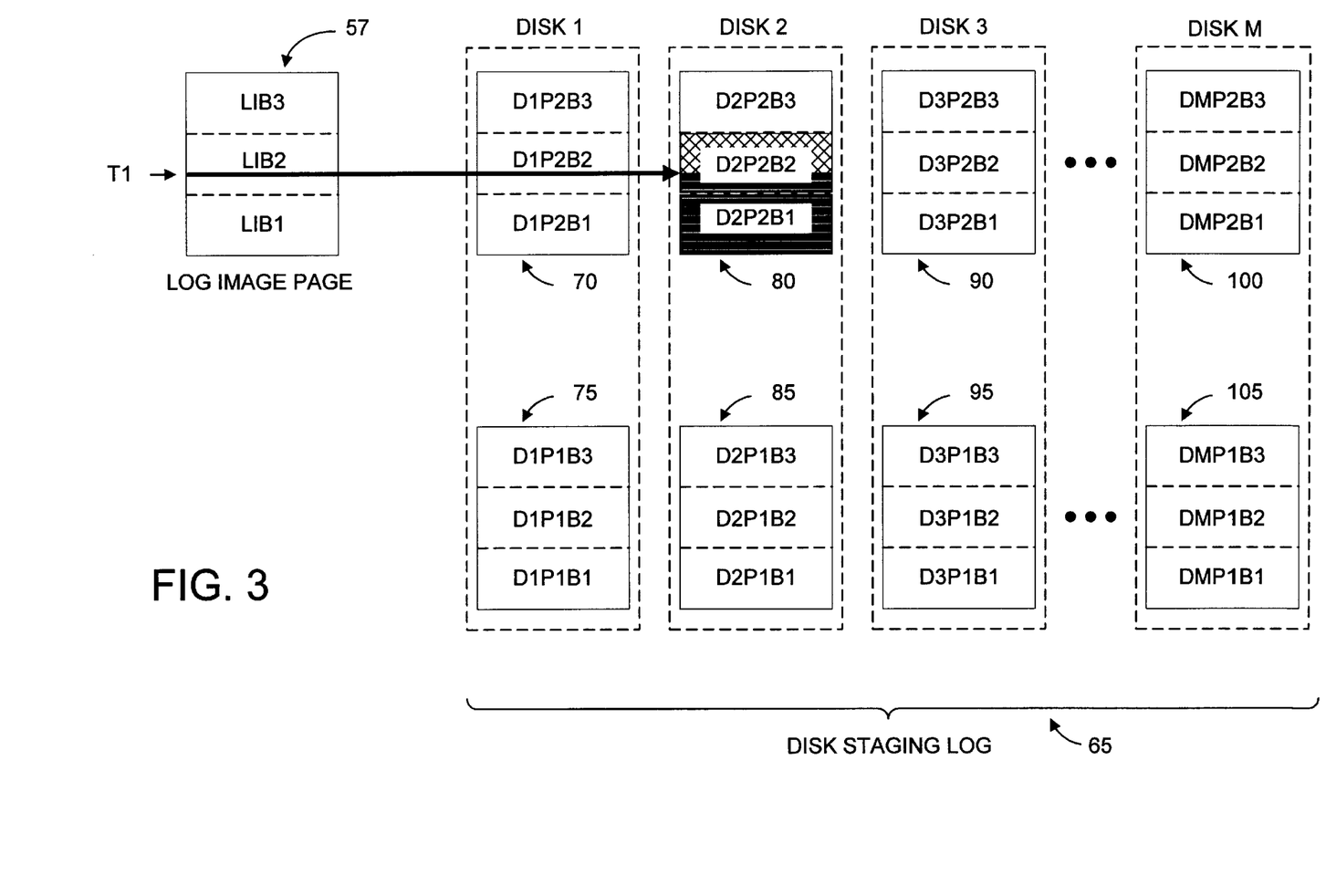
FIGS. 3–6 are block diagrams depicting the disk staging log of the present invention at various snapshots in time.

Now in reference to FIG. 3, logical marker T1 reflects a given point in time when a specified event occurs (as requested by RAID management system 16, FIG. 1) to initiate a "force" posting of the unwritten data of page 57 of RLI 55 to disk staging log 65. T1 further identifies a location that is indicative of how "full" RLI page 57 is with log data at that given point in time. When a posting is requested, full blocks of unwritten data (in page 57 of RLI 55) are posted as identified by logical marker T1. Full blocks are posted since a 512 byte block of data is the minimal posting size (per arbitrary system design requirements in this example).

Thus, for example, upon the occurrence of event/time T1, RLI 55 posts its "unwritten" contents (as referenced by location T1) in page 57 to one of the disk staging areas 70–105 of the least busy disk 1–M of disk staging log 65—subject to the "toggle" aspect discussed more fully hereafter. Specifically, block "one" of Log Image page 57 (LIB1) will be posted in its entirety because it is "unwritten" and completely full, and block "two" of the Log Image (LIB2) is also "unwritten" and thus will also be posted in its entirety (even though log data only partially fills LIB2, i.e., up to event/time T1). Assuming (arbitrarily) that disk 2 is detected as being the least busy and that posting will begin with an even page number in disk staging log 65, then page 57 posts its block contents LIB1 and LIB2 to corresponding blocks B1 and B2 of page P2 (80) of disk D2 (i.e., D2P2B1 and D2P2B2) of disk staging log 65. Block D2P2B1 thus contains all valid data (shown in reverse video horizontal line format), and block D2P2B2 contains partial valid data up to time/marker T1, and the rest of block D2P2B2 contains invalid data, or "don't care" data (shown in cross hatch).

Figure 4:
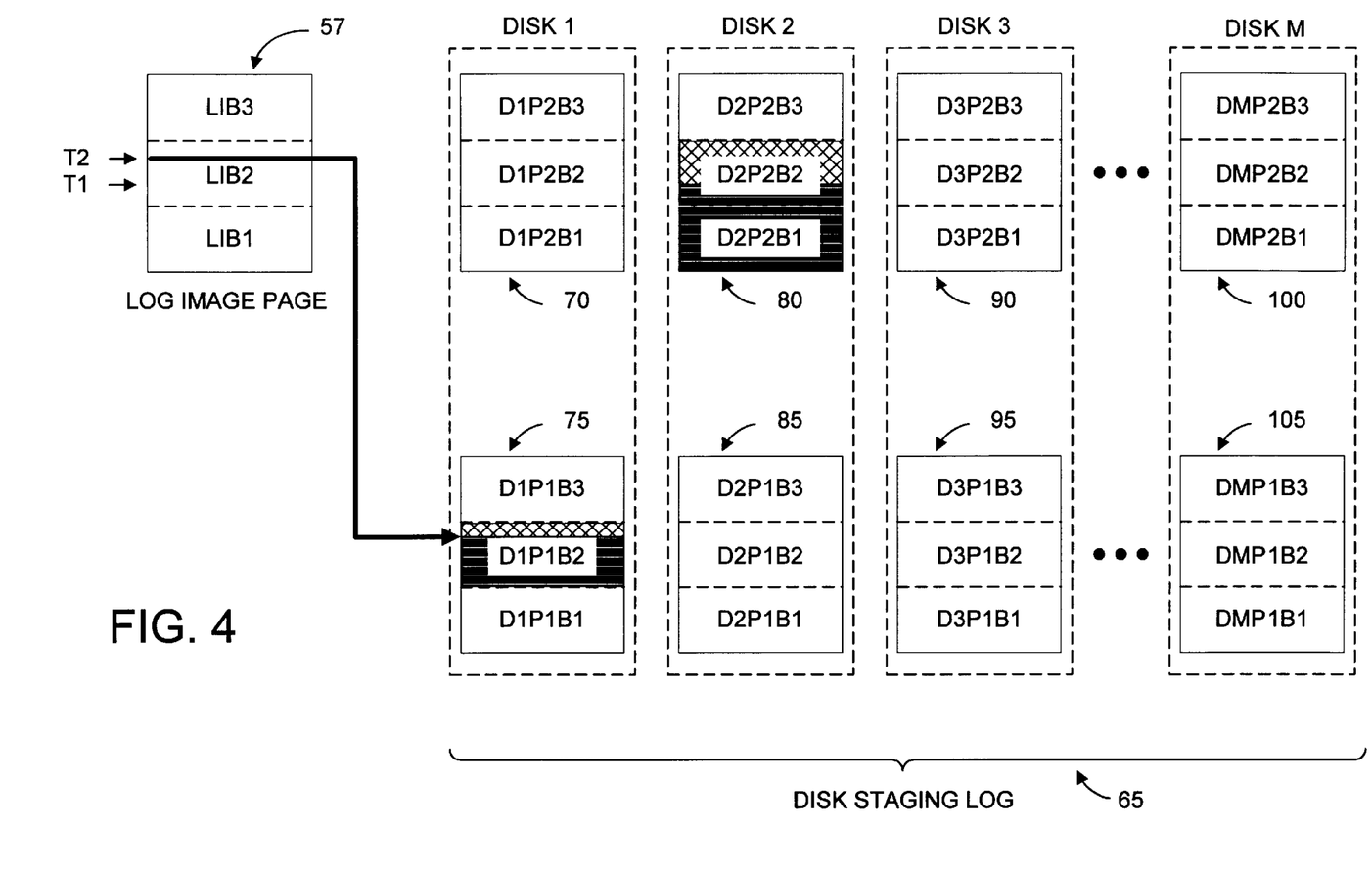

Referring now to FIG. 4, a second event/time T2 identifies where RAID management system 16 again requests that RLI 55 post its data. In this instance, the Log Image page 57 data stored between time T1 and T2 (i.e., the "unwritten" data) must be posted to disk staging log 65 (since a page-full status was not yet achieved). (If, however, all of page 57 was filled with transaction data prior to event/time T2, then RLI 55 would post the entire page 57 to disk log 60 rather than posting only a portion to disk staging log 65). Assuming that disk 1 is the least busy disk now, and knowing that write I/O occurs only in full block sizes, then all of LIB2 is written to D1P1B2. The odd page P1 (75) is written this time to accommodate the page "toggling" (swapping) data protection technique previously described. The invalid data (i.e., the data beyond the specified time marker T2 that is within the block size) is again shown in cross hatch.

Figure 5:
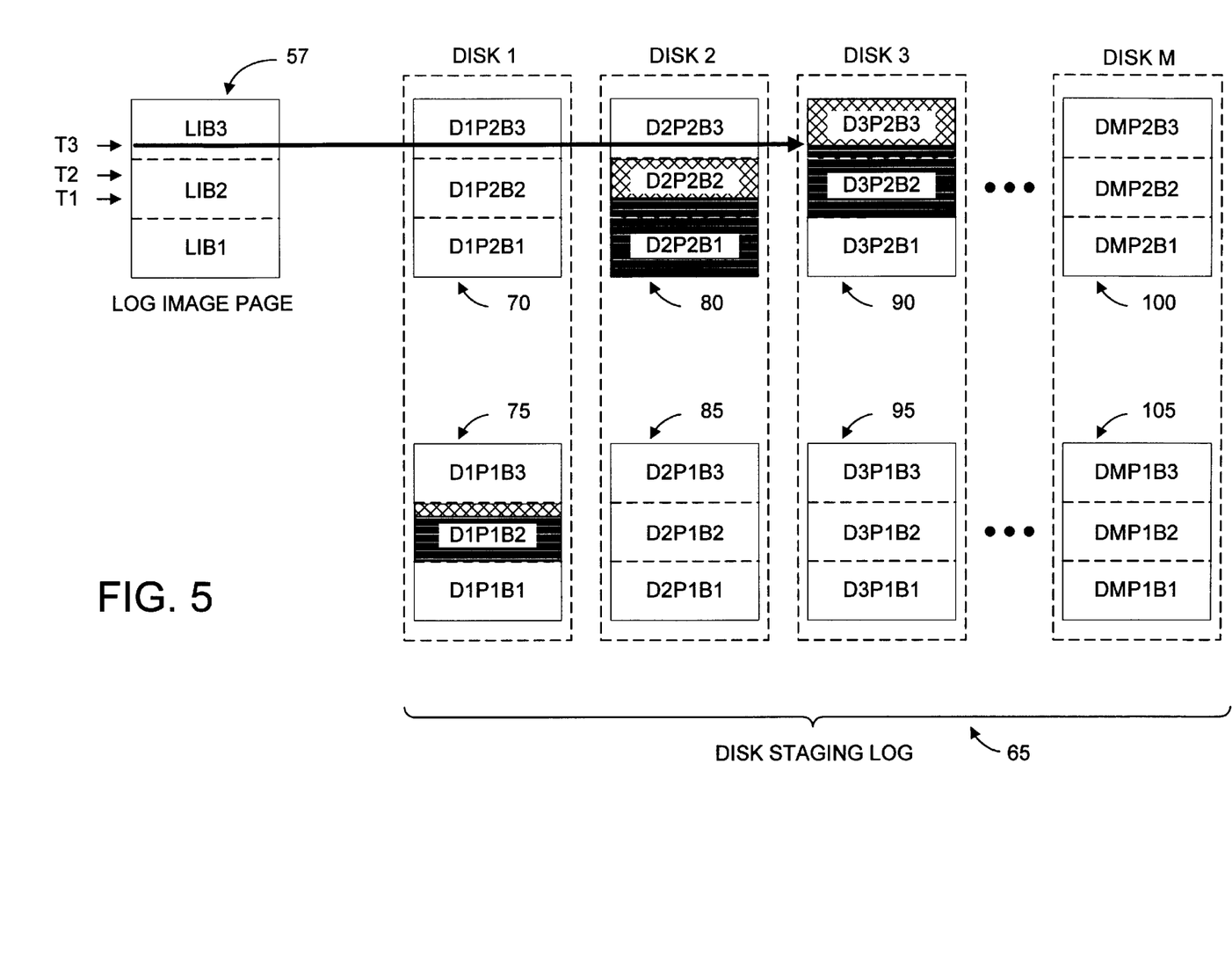

FIG. 5 shows yet a third event/time T3 wherein RLI 55 again is requested to post its data before a page-full status has been achieved. In this instance, the Log Image page 57 data stored between time T2 and T3 (the "unwritten" data) must be posted. As such, assuming in this instance that disk 3 (D3) is the least busy, then all of LIB2 is posted to D3P2B2, and all of LIB3 is posted to D3P2B3. Again, to accommodate page swapping, "even" page P2 (90) is written this time.

Figure 6:
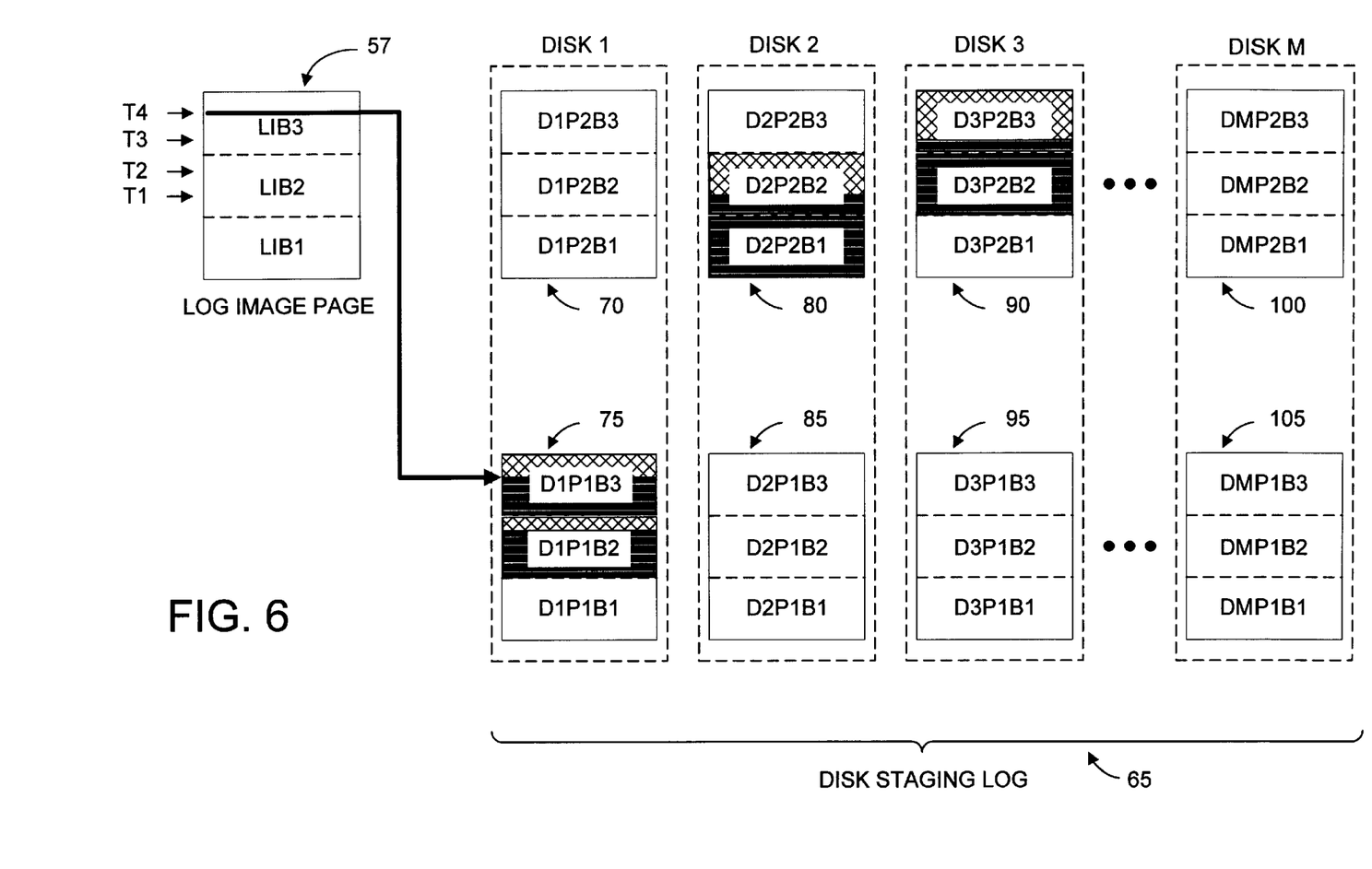

FIG. 6 shows a fourth event/time T4 wherein RLI 55 again is requested to post its data before a page-full status is achieved. In this instance, the "unwritten" Log Image page 57 data stored between time T3 and T4 must be posted. As such, assuming in this instance that disk 1 (D1) is the least busy again, all of LIB3 is force posted to D1P1B3.

As can be seen with respect to FIGS. 3–6, overall system I/O performance impact is reduced not only because the least busy disk is written to, but also because no redundant writes to disk or disks occur. Rather, redundancy is maintained by the fact that the log data is written on disk (disk staging log 65) and yet also remains in RLI 55. In addition, it should be noted again that, in a preferred embodiment, a "force" to disk staging log 65 occurs for events that occur prior to a page-full status for RLI 55, and a "flush" occurs from RLI 55 to disk log 60 (FIG. 2) in the event a page-full status for RLI 55 is detected.

Figure 7:
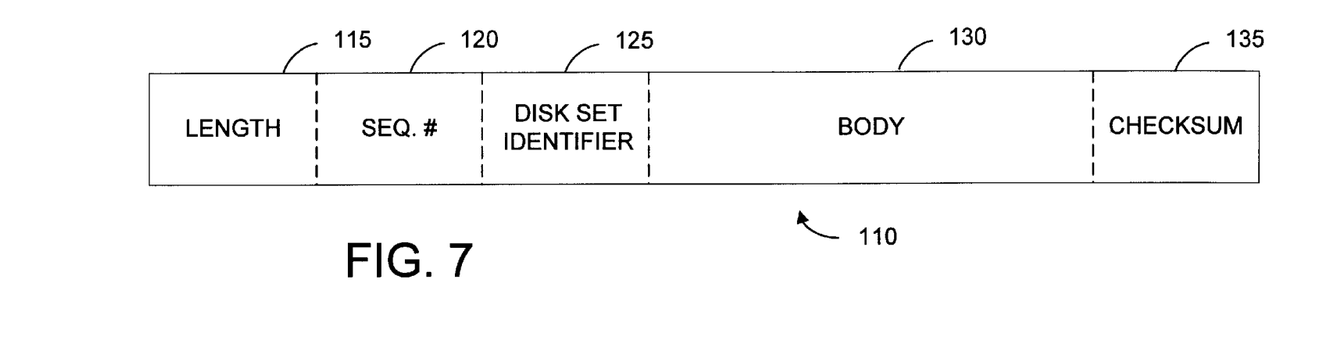
FIG. 7 is a block diagram of a data record.

Referring now to FIG. 7, a record 110 of data used in connection with the distributed writing of the present invention is shown in block diagram. Each 512 byte block (sector) of data in RLI 55 (and disk log 60 and disk staging log 65) comprises one or more records 110, and a record 110 may cross block boundaries. For illustration purposes, record 110 is shown in simplified form, i.e., not all fields are depicted that may be used with the record. However, record 110 includes at least a length indicator 115 for identifying the record length, a sequence number 120 for identifying sequencing of records for restoring the data from disk staging log 65, a disk set identifier 125 for identifying the disk set associated with the transaction log, a body 130 for holding the actual log data being stored, and a checksum 135 for data validation purposes.

Sequence number 120 is a generated number that is sequentially incremented for each new record added to the transaction log. Checksum 135 is a checksum of the whole record 110 and is used to validate the status of the record during transaction log recovery. Disk set identifier 125 is an arbitrary identifier of the current instance of the disk set that is associated with RLI 55, and is used to insure that "stale" (i.e., invalid) staging log 65 data is not used during transaction log recovery. Namely, during recovery, a record is recognized as valid if its disk set identifier 125 matches the current instance of the disk set, but the record is recognized as invalid if its disk set identifier 125 does not match the current instance of the disk set. A stale record or records may occur, for example, if a disk drive is swapped in from another disk set. If so, the disk set identifier associated with each record enables the transaction log recovery process to recognize and not use any stale data associated with that new disk. Simply put, the record's disk set identifier must match the current disk set instance.

Figure 8:
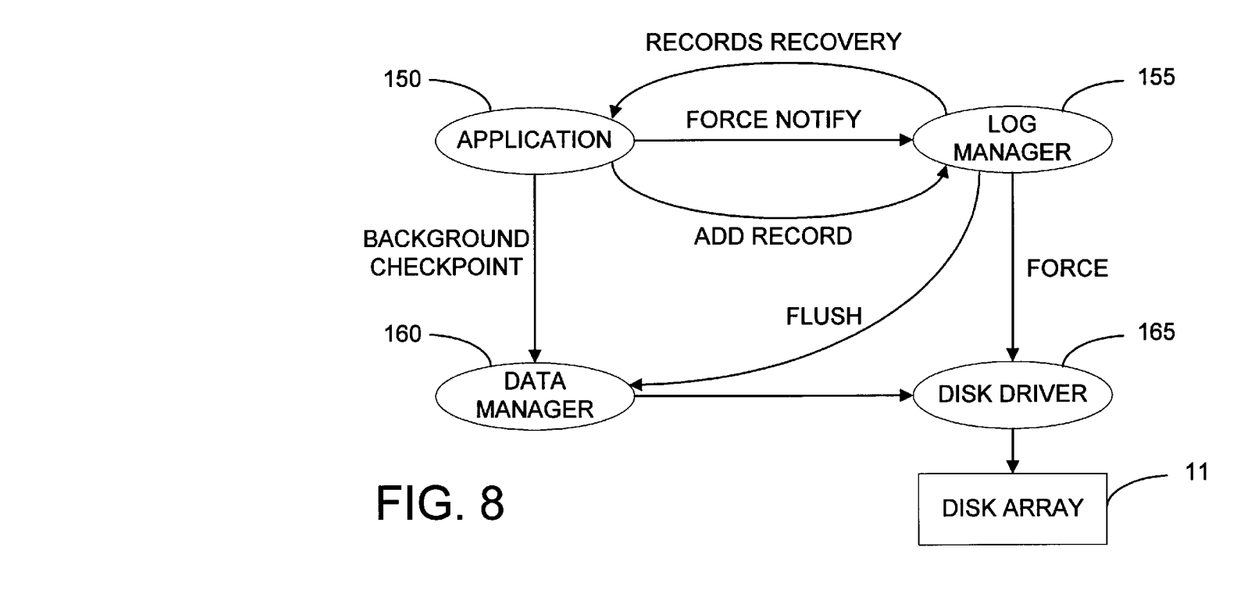
FIG. 8 is a block diagram showing process flow for the distributed write disk log.

Referring now to FIG. 8, a block flow diagram depicts the interrelation of processes embodied within RAID Management System 16 (of FIG. 1) for managing log transactions of the present invention. These processes are, preferably, implemented in firmware. When an application 150 (for example, RAID Management System 16 of FIG. 1) manipulates NVRAM map 45 (FIG. 2), a record 110 identifying the manipulation activity is added to the control of log manager 155 and stored in RAM Log Image 55 (FIG. 2). Records are continually added until one of several key events occurs. In the event the current page in RLI 55 becomes full, then log manager 155 "flushes" its full page by transferring control to data manager 160 which in turn interfaces with disk driver 165 for redundantly posting the full page contents to disk log 60 of disk array 11. In the event the current page in RLI 55 is not full, but log manager 155 detects the event to be a request to "force" a posting to disk staging area 65 of array 11, then log manager 155 bypasses data manager 160 and interfaces directly with disk driver 165 to "force" post the data to the array. No redundant copy is written after a "force" post occurs.

Now in reference to all the Figures, in the event of a need for log recovery due to some memory or system failure, several steps occur to recover the incremental log data stored in disk log 60 and disk staging log 65. First, all full pages of disk log 60 are copied to RLI 55 to reconstruct as much of the log data as possible. However, a non-full page, such as page 59, may have data sitting in disk staging log 65 that also needs to be copied to RLI 55. Thus, the fragments of log data from all pages 70–105 of disk staging log 65 on disks 1–M must be collapsed into a single complete image for copying to RLI 55. In preparation for this recovery from disk staging log 65, RLI 55 is scanned to find the record with the sequence number 120 that is indicative of the last (most recent) record written to disk log 60. This scan must account for both circularity of the log and wrapping of the sequence numbers. The next consecutive sequence number (record) following the last one written must be found, if at all, in disk staging log 65. Accordingly, disk staging log 65 is then scanned to find the record having the next consecutive sequence number (being indicative of the next record to be restored to RLI 55). Once the next record (sequence number) is found in disk staging log 65, the disk set identifier 125 is checked to ascertain that the record belongs to the current instance of the disk set. Additionally, the record's checksum 135 is evaluated to determine the integrity of the record. If all is well, then that record is copied to RLI 55 to continue the transaction log recovery process. In the example of FIG. 6, the first record in block D2P2B1 satisfies this first step recovery criteria.

Subsequently, disk staging log 65 is then scanned again for a next consecutive record that follows in incremental sequence number order. Given the known length 115 of the previously found record, it is known that the next record will start at the offset described by the length 115 of the previously found record. As such, all disk staging log areas 65 are searched at that offset address until the next record is found that starts at that offset, that has the proper next consecutive sequence number 120, that has the proper disk set identifier 125, and that satisfies the checksum 135 validity analysis. In the example of FIG. 6, the second record in block D2P2B1 (not visibly distinguished) satisfies this recovery criteria. Once found, the record is copied to RLI 55.

Generally stated, this entire process of (i) finding the next consecutive record (identified by the next consecutive incremental sequence number), (ii) verifying the disk set identifier, and (iii) verifying the checksum, is continually repeated throughout staging log 65 until all records are recovered that satisfy each of these recovery criteria. To further illustrate, for example, relative to FIG. 6, each of the valid records identified in D2P2B1 and D2P2B2 (denoted in reverse video horizontal linings) will first be restored to RLI 55 in that order. Then, any of the valid records found in D1P1B2 or D3P2B2 will satisfy the next recovery steps. For example, if the next valid record was first found in D1P1B2 before D3P2B2, then all the valid records in D1P1B2 would be copied (sequentially, one at a time) to RLI 55, and the remainder of the valid records that were not found in D1P1B2 would subsequently be found in D3P2B2 and would continue on through the valid records of D3P2B3. On the other hand, if the next valid record was first found in D3P2B2 (rather than D1P1B2), all those valid records would be copied to RLI 55, and then the valid records of D3P2B3 would be copied to RLI 55. Only subsequently, then, would the final valid records found in D1P1B3 be processed and copied to RLI 55. The final record is known to be recovered from disk staging log 65 when no other next consecutive sequence number is found in any other record in disk staging log 65.

For the illustrated examples, log recovery for disk log 60 and disk staging log 65 is now complete to RLI 55. As such, referring again to FIG. 8, log manager 155 passes the recovered records (now found in RLI 55) back to the control of application 150 (RAID management System 16, FIG. 1) indicating that log recovery is complete and that application 150 may now proceed to effectuate the log changes noted in RLI 55 in order to place NVRAM map 45 back in a state that existed prior to the system error/failure that initiated the transaction log recovery process.

What has been described above are the preferred embodiments of a method and apparatus for improving disk log write performance using distributed write operations across multiple disks in a disk array. It will be obvious to one of ordinary skill in the art that the present invention is easily implemented utilizing any of a variety of software, firmware and/or hardware components existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of writing to a storage system having multiple storage media, the method comprising:
 (a) in response to a first detected criteria that is indicative of a request to write to the storage system, writing data to the storage system without regard to any least busy storage media; and,
 (b) in response to a second detected criteria that is indicative of a request to write to the storage system:
   (i) selecting a least busy storage media from the multiple storage media;
   (ii) writing data to the selected least busy storage media; and,
   (iii) recording indicia for identifying the data most recently written.

2. The method of claim 1 wherein the multiple storage media are random access storage media.

3. The method of claim 1 wherein the least busy storage media is selected based on input/output (I/O) activity.

4. The method of claim 1 wherein the second detected criteria includes a request to force a posting of a transaction log to the storage media.

5. The method of claim 4 wherein the request to force a posting occurs prior to a designated portion of the transaction log being detected as being full with the data.

6. The method of claim 1 wherein in response to the first detected criteria the data is written to the storage system redundantly, and in response to the second detected criteria the data is written to the selected least busy storage media non-redundantly.

7. The method of claim 1 wherein the data includes indicia indicative of a sequence ordering of the data being written.

8. The method of claim 1 wherein each of the storage media includes a reserved area used only for writing when the least busy storage media is selected.

9. The method of claim 8 wherein the reserved area includes at least two sub areas, and wherein one of the sub areas is written to upon a first event of selecting a least busy storage media, and the other of the sub areas is written to upon a next consecutive event of selecting a least busy storage media, whereby no immediately previously written sub area is overwritten on a next consecutive write in the event of a same least busy storage media being selected twice consecutively.

10. A method of writing a transaction log to a data storage system having multiple storage media, the method comprising:

(a) detecting an event pertinent to the transaction log;

(b) in response to a first detected event pertinent to the transaction log, writing to the storage system such that redundancy of the transaction log is maintained on the multiple storage media; and, (c) in response to a second detected event pertinent to the transaction log, writing to a least busy storage media of the multiple storage media, and writing such that redundancy of the transaction log is not maintained on the multiple storage media.

11. The method of claim 10 wherein the transaction log is stored in a first memory prior to writing to the storage system, and wherein the first detected event includes a status indicative of the transaction log filling a given portion of the first memory.

12. The method of claim 10 wherein the transaction log is stored in a first memory prior to writing to the storage system, and wherein the second detected event includes an event indicative of something other than the transaction log filling a given portion of the first memory.

13. The method of claim 10 wherein the least busy storage media is selected based on input/output (I/O) activity of that storage media.

14. The method of claim 10 wherein each of the storage media includes a reserved area used only for writing when the second event is detected, and wherein the reserved area includes at least two sub areas, and wherein one sub area is written to upon a first event of selecting a least busy storage media, and the other sub area is written to upon a next event of selecting a least busy storage media, whereby no immediately previously written sub area is overwritten on a next consecutive write.

15. A storage system comprising:

(a) a first memory for holding data records;

(b) multiple storage media connected to the first memory;

(c) means for detecting an event pertinent to the first memory;

(d) means for writing the data records to the storage system pursuant to a first storage management criteria in response to a first detected event pertinent to the first memory; and, (e) means for writing the data records to the storage system pursuant to a second storage management criteria in response to a second detected event pertinent to the first memory, the second storage management criteria including writing to a least busy storage media of the multiple storage media and recording indicia for identifying the data records most recently written.

16. The storage system of claim 15 wherein the first detected event includes an event indicative of a portion of the first memory being full with the data records.

17. The storage system of claim 15 wherein the first storage management criteria includes maintaining redundancy of the data records on the multiple storage media.

18. The storage system of claim 15 wherein the second detected event includes an event indicative of something other than the transaction log filling a given portion of the first memory.

19. The storage system of claim 15 wherein the second storage management criteria includes not maintaining redundancy of the data records on the multiple storage media.

20. The storage system of claim 15 wherein the least busy storage media includes at least two sub areas reserved for writing the data records.

21. The storage system of claim 15 wherein the second storage management criteria includes writing into the data records indicia indicative of a sequence ordering of the data being written.

* * * * *